United States Patent [19]

Saito

[11] Patent Number: 5,363,634
[45] Date of Patent: Nov. 15, 1994

[54] VEGETABLE TOPPER AND METHOD FOR TOPPING TUBER VEGETABLES

[75] Inventor: Al Saito, Weiser, Id.

[73] Assignee: Veggie Vac Company, Weiser, Id.

[21] Appl. No.: 13,692

[22] Filed: Feb. 4, 1993

[51] Int. Cl.⁵ ...................... A01D 23/04; A01D 33/02
[52] U.S. Cl. ............... 56/121.42; 56/121.44; 171/17
[58] Field of Search .................. 56/12.9, 13.1, 121.44, 56/121.42, DIG. 8; 171/17; 99/635

[56] References Cited

U.S. PATENT DOCUMENTS

| | | | |
|---|---|---|---|
| D. 153,673 | 2/1947 | Elliotte . | |
| D. 198,094 | 4/1964 | Figley . | |
| D. 221,991 | 9/1971 | Jensen . | |
| D. 228,011 | 7/1973 | White et al. . | |
| D. 242,014 | 1/1977 | Kilburn et al. . | |
| D. 253,057 | 10/1979 | Fachini et al. . | |
| 1,347,733 | 7/1920 | David | 56/158 |
| 2,026,291 | 12/1935 | Tirimacco | 56/13.3 |
| 2,453,714 | 11/1948 | Lapointe | 171/130 X |
| 2,579,013 | 12/1951 | Sampson | 56/12.9 X |
| 2,651,157 | 9/1953 | Drake | 171/17 X |
| 2,734,331 | 2/1956 | Phillips | 56/296 |
| 3,163,234 | 12/1964 | Boyer | 171/17 |
| 3,285,306 | 11/1966 | Wetzel | 171/17 X |
| 3,430,421 | 3/1969 | Matthews | 56/16.9 X |
| 3,828,531 | 8/1974 | Quick | 56/12.9 |
| 4,747,260 | 5/1988 | Petrasch et al. | 56/505 |
| 4,757,670 | 7/1988 | Kinch et al. | 56/121.42 X |
| 4,783,951 | 11/1988 | Richards et al. | 56/12.9 |
| 4,838,012 | 6/1989 | Bowen, III | 56/13.1 |
| 4,924,664 | 5/1990 | Hicks et al. | 56/202 |
| 5,107,664 | 4/1992 | Ross et al. | 171/17 X |

FOREIGN PATENT DOCUMENTS

| | | | |
|---|---|---|---|
| 3111390 | 10/1982 | Germany . | |
| 3317568 | 12/1983 | Germany | 56/121.44 |
| 1380660 | 1/1985 | U.S.S.R. . | |

Primary Examiner—David J. Bagnell
Attorney, Agent, or Firm—Knobbe, Martens, Olson & Bear

[57] ABSTRACT

A vegetable topper for cutting the leafy tops off of tubers, such as onions, after they have been uprooted from the field. The topper is mounted on a wheeled moveable frame towed by a tractor, which uses a vacuum to lift the tops and snip them off. The power for the vacuum fan and topping operation is derived from a power take-off of the tractor. The shearing means comprises a linearly reciprocating sickle blade whose height relative to the oncoming tops is optimally predetermined for a shearing type of cut for varying sizes of onions, providing maximum efficiency. The sheared tops are substantially mulched into fine particles within a fan in the vacuum system and dispersed to the side of the topper. A conveyor system lifts the untopped onions into proximity with the fan and sickle blades and consolidates already topped onions into a reduced area. Two pick-up conveyors lift up the untopped onions and a funnel-shaped rear chute delivers the topped onions back to the ground, resulting in a reduced gathering area. Remotely steerable rear wheels provide enhanced turning capability.

35 Claims, 11 Drawing Sheets

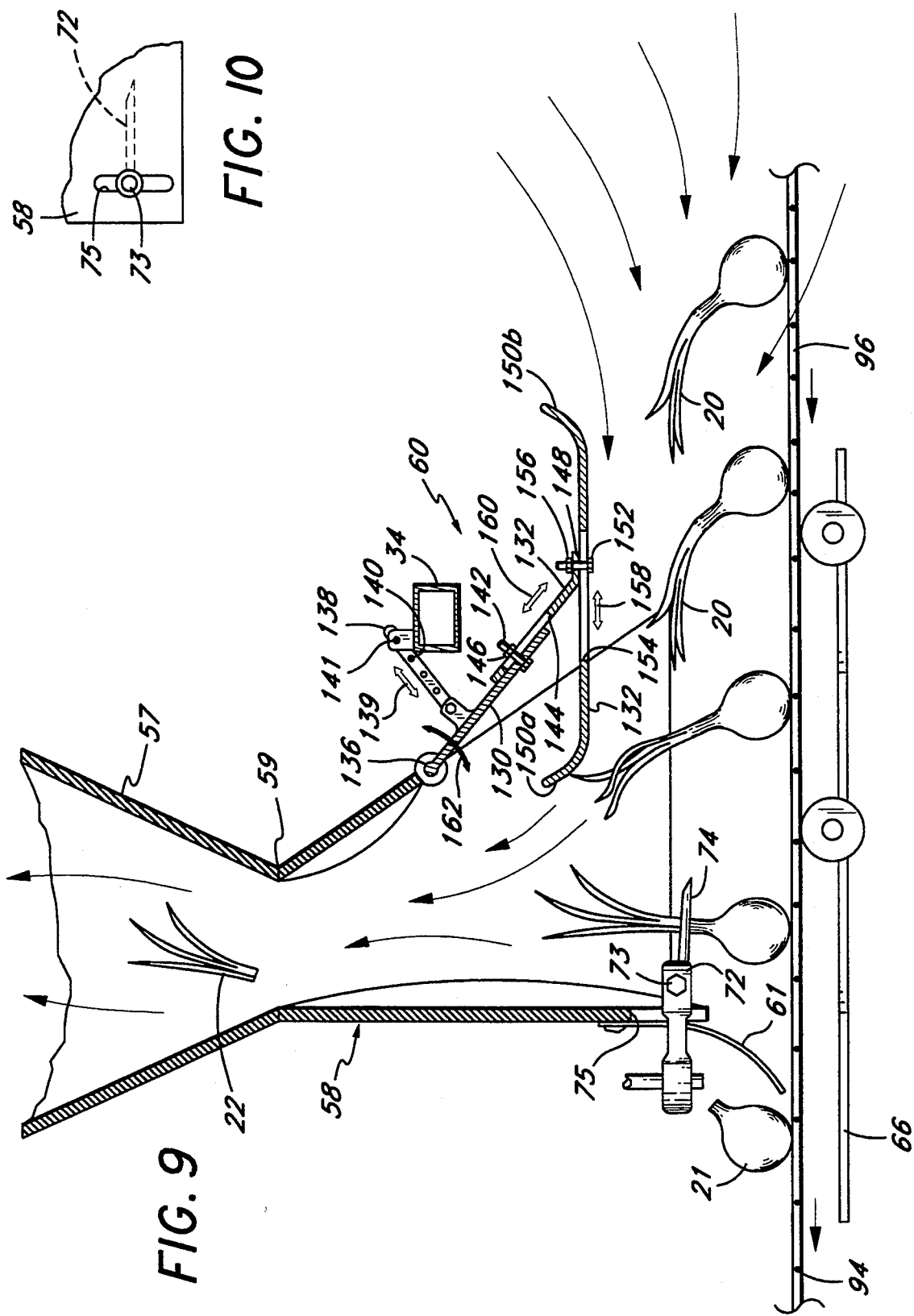

VEGETABLE TOPPER AND METHOD FOR TOPPING TUBER VEGETABLES

FIELD OF THE INVENTION

The present invention relates to harvesting and topping vegetables such as onions.

BACKGROUND OF THE INVENTION

In tubers, such as onion plants, the edible part of the plant is the bulbous lower portion while a leafy top extends above the bulb. An acre of commercial onions can contain between 80,000 and 150,000 plants, with each bulb weighing between ½ to 2 lbs., and with the green leafy top or stalk portion weighing almost as much as the bulb. Upon reaching maturity, the stalks of the onions wither and fall onto the ground. The bent stalks lie all over the ground and hinder visibility of, and ready access to, the ripe bulbs. The harvesting process is complicated by the matted covering of the onion tops on the ground.

Currently, onions are uprooted by a breaker bar which is pulled through the ground below the onions to thrust the onions out of the ground. After drying for a few days, the uprooted onions are manually topped by grabbing the onion stalks and using scissors to cut off the tops, after which the onions are mechanically or manually gathered, and taken to a facility for packing or storage.

In some cases, the uprooted, untopped onions are mechanically gathered and taken to a packing area where the onions are again manually topped with scissors or clippers. All onion residues are discarded at this stage if they have not been eliminated earlier. Because the onion tops are acidic, the disposal of large quantities of onion tops gathered at the packing facilities becomes a great environmental concern, with attendant difficulties in environmentally safe disposal of large quantities of tops.

As the onion crop becomes ripe and ready for harvesting at about the same time in a given geographical region, large numbers of workers must be employed to accomplish the manual topping task. This manual labor is very expensive, and creates significant uncertainties in arranging and coordinating sufficient numbers of workers, if they are even available when needed.

Several patents disclose equipment to top onions and tubers. The most recent development is disclosed in U.S. Pat. No 5,107,664, entitled "VEGETABLE TOPPER" owned by the same entity as the current invention. The machine raises and cuts the tops off of tubers in two adjacent rows and consolidates the topped tubers into one row. Disadvantageously, the means used to raise the tops is a large vacuum hood located a few inches off of the ground which also suctions an appreciable amount of topsoil along with the onion tops, creating a large dust cloud which can prove unacceptable. The nature of the vacuum force underneath the hood varies quite a bit depending on the terrain and disposition of the onions in the ground.

Patents to Davis (U.S. Pat. No. 1,347,733) and Sampson (U.S. Pat. No. 2,579,013) both disclose a machine for raising and cutting potato-vines and the like, and onions, respectively. A disadvantage of both devices is that only a small area below the fans can be harvested. Another disadvantage is the distribution of whole, severed vines back onto the field, covering the crops on adjacent rows which then are difficult to locate and harvest.

U.S. Pat. No. 4,757,670, issued to Kinch, describes an agricultural crop defoliator which uses a blowing technique to elevate the tops of plants for cutting. Soviet Union Patent No. 3840-660-A, issued to Vege, discloses a stem cutter for trimming onion haulms (stalks). Rotating elastic rods lift the tops of the plants to come in contact with rotating blades inside a drum.

The harvesting equipment described in the above-mentioned patents share the common disadvantage of being cumbersome to maneuver around sharp corners, requiring large areas at the ends of the fields to allow the devices to be turned. U.S. Pat. No. 5,107,664 discloses steerable rear wheels, yet the distance from the rear wheels to the tractor wheels is around 18 feet, requiring a substantial space at the end of each row to turn. Sampson, Kinch and Vege show simple towed devices which restrict the arc of turn to that which avoids jack-knifing or collision between the towing and towed vehicles. Davis allows for steering wheels on the front which would limit the arc of turn to that allowed by the wheel base of the device. There is thus a need for a device with steering that enables sharp corners to be made, so that more crops can be planted in the fields.

Whatever the claimed advantages of the prior equipment, the current widespread use of inefficient and costly manual labor demonstrates that these prior inventions did not succeed. While U.S. Pat. No. 5,107,664 cures many of these problems, it fails to address the significant problem of dust clouds and unsteady vacuum force. There thus exists a need for a mechanical topper that addresses the above needs, and overcomes the drawbacks of prior vegetable topping machines by increasing the harvesting efficiency without damaging the tubers or bulbs.

SUMMARY OF THE INVENTION

The vegetable topper of this invention relates to a system of consolidating the crops for ease of gathering. Two or more rows of crops such as onions are picked up and deposited back on the ground in a reduced area by use of a system comprising one or more pick-up conveyors with flappers at their front end for propelling the onions onto the conveyor, and a consolidation chute mounted at the rear of the two conveyors. The consolidation system is advantageously towed behind a tractor and mounted on a wheeled frame.

The vegetable topper of this invention also relates to a machine for removing the stalks, or tops, from tubers, such as onions, by lifting the tops with a suction or vacuum and shearing them off. A vacuum/sickle system is mounted above the conveyor system to lift the onion tops without sucking in an inordinate amount of dirt, as with prior designs.

Additionally, the vegetable topper relates to a system and method for discharging the tops to the side as a fine mulch using a vacuum/shearing system at the rear of the tractor and driven by a power take-off (PTO). The mulch degrades faster than the whole onion tops, and allows efficient disposal and use of the onion tops while avoiding the environmental problems associated with disposing of large quantities of tops at processing plants. The PTO provides power for the vacuum fan and rotating conveyor shaft, which, in turn actuates the flappers. A hydraulic system provides fluid pressure to separate pistons to steer the wheels, lift the pick-up conveyors, lift the rear chute, and also provides fluid to a hydraulic motor for actuating the sickle blade.

A preferred apparatus comprises two parallel pickup conveyors mounted on a wheeled frame with the front end of the conveyor being positionable along a substantially vertical axis. Advantageously, the pickup conveyors have a length sufficient to extend across a plurality of beds of onions. The front ends of the conveyors extend to just above the ground and the conveyors rotate in a direction such that onions deposited on the front ends may be transported along the length of the pickup conveyors. Onions are urged onto each conveyor by a rotating shaft to which are attached a plurality of flexible members which rotate in a direction which urges the onion bulbs off of the ground onto the conveyor.

The apparatus also severs the tops of onions without damaging the bulb of the onion, while mulching the tops for disposal. The apparatus comprises a fan mounted on the wheeled frame and having a plurality of blades which rotate in a housing to create a suction. The fan is constructed with the blades sufficiently close to the housing, and rotating at such a speed that during operation the fan chops the tops of the onions into small pieces and discharges the chopped tops out an exit from the fan housing. Advantageously, the PTO of a tractor is used to drive the fan. The fan preferably has a non-stick lining on a portion of the inside of the housing adjacent the exit sufficient to prevent the chopped onion tops from sticking to the housing and clogging the fan.

A suction hood is mounted on the support frame in a location near the untopped onions on the pickup conveyors. The hood is in fluid communication with the fan so that sufficient suction is applied to the onions under the hood to lift the tops of the onions away from the conveyors on which the onions are located. A suction plate to control the amount of suction is placed below the conveyor so the onions are between the plate and the hood. The front section of the hood includes an adjustable assembly which allows the hood to adapt to varying onion heights and moisture content. An elongated plate pivots about a transverse hinge at the front side of the vacuum hood. An intermediate elongated plate is arranged to slide toward and away the hinge over the first plate. Finally, a generally horizontal plate with upturn ends slides relative to the intermediate plate and creates a generally laminar air flow through and over the onions.

A cutter bar is located in the suction hood and extends along the length of the suction hood for a distance sufficient to provide a scissor-like cutting action to simultaneously cut the tops off a plurality of onions as the tops are lifted by the suction. The cutter bar is advantageously mounted generally parallel to the conveyor portion located beneath the hood. Advantageously, the cutting angle is such that the tops are cut substantially square relative to the vegetable stalk or, for example, the onion bulb.

In further embodiments, a pair of wheels are located at the rear of the support frame, with the wheels being steerably connected so as to enable the apparatus to turn corners sharper.

The invention also comprises an improved method of moving onions from the ground to a second location by using two pickup conveyors spanning a plurality of rows of tubers; and moving the onions from the second location of the pickup conveyors to a third location by a rear chute, the rear chute being vertically positionable to allow it to be lifted from close contact with the ground. Advantageously, the method may further include the step of steering the device, which implements the method of cutting the tops of the tubers, by a pair of wheels located at the rear of the device, to enable the device to turn corners sharper.

The improved method further includes cutting the tops off of tubers while not damaging the tubers and while reducing topsoil erosion, and as such comprises the steps of using a fan with a plurality of fan blades to create a suction sufficient to lift the tops of tubers into a position for cutting; using the blades of the suction fan to further chop the cut-off tops into a plurality of small pieces; placing a non-stick surface on those portions of the fan where chopped pieces of the vegetable tops would otherwise stick in sufficient quantity to clog the fan so that the chopped tops do not stick and clog the fan; communicating the suction to an area covering the conveyor with sufficient suction to lift the tops of the tubers as needed for cutting; and simultaneously cutting a plurality of tops with a scissors-type cutting action by a sickle-type cutting bar. The previously mentioned suction plate provides a method to locally control the suction.

BRIEF DESCRIPTION OF THE DRAWINGS

The present invention will be better understood from the description of the illustrated embodiment which is given below, taken in conjunction with the drawings (like reference characters or numbers refer to like parts throughout the description), and in which:

FIG. 9 is a partial cross-sectional view of the vacuum hood showing lines of air flow;

FIG. 10 is a detail of the sickle height adjustment mechanism;

DETAILED DESCRIPTION OF THE ILLUSTRATED EMBODIMENT

Figure 1:
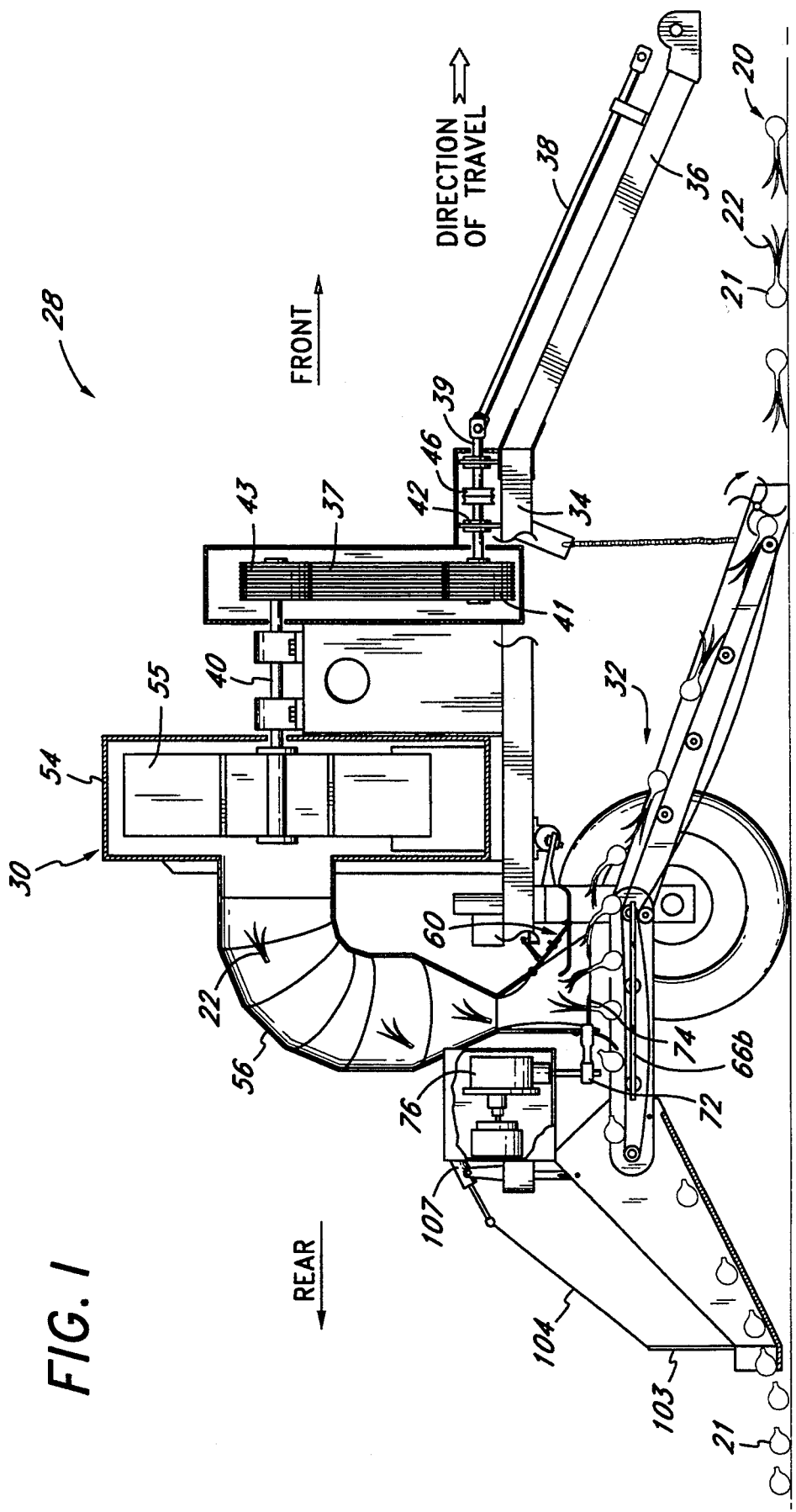
FIG. 1 is a left side elevational view of the vegetable topper in an onion field with portions cutaway to show the path of the onions.

In FIG. 1, a vegetable topper 28 designed to top tubers, such as onions 20, is shown. The topper 28 spans two parallel onion beds, comprising four double rows of onions 20 per bed. The beds are separated by tracks for vehicle tires. The onions 20 comprise a lower bulb 21 portion and a leafy top 22 portion extending from the upper end of the bulb. Each of the beds are generally about forty inches wide.

As shown in FIG. 1, the onions 20, with their tops 22 still attached, have been broken loose or ejected from the ground by a breaker bar which was previously pulled through the ground, below the onions, as is well known in the art and not described in detail herein. Alternatively, the topper 28 of the present invention could easily be configured with a breaker bar to perform the uprooting operation. Normally, however, the onions 20 are uprooted and left to dry in the fields for several days. Dry onions 20, with their tops 22 connected, are shown as they lie in the field in front of the vegetable topper 28, while the resulting topped onion bulbs 21 are seen at the rear of the vegetable topper 28. As used herein, "front" refers to the end of the vegetable topper 28 which includes a towing draw bar 36, and "rear" refers to the opposite end, as noted in FIG. 1.

Figure 2:
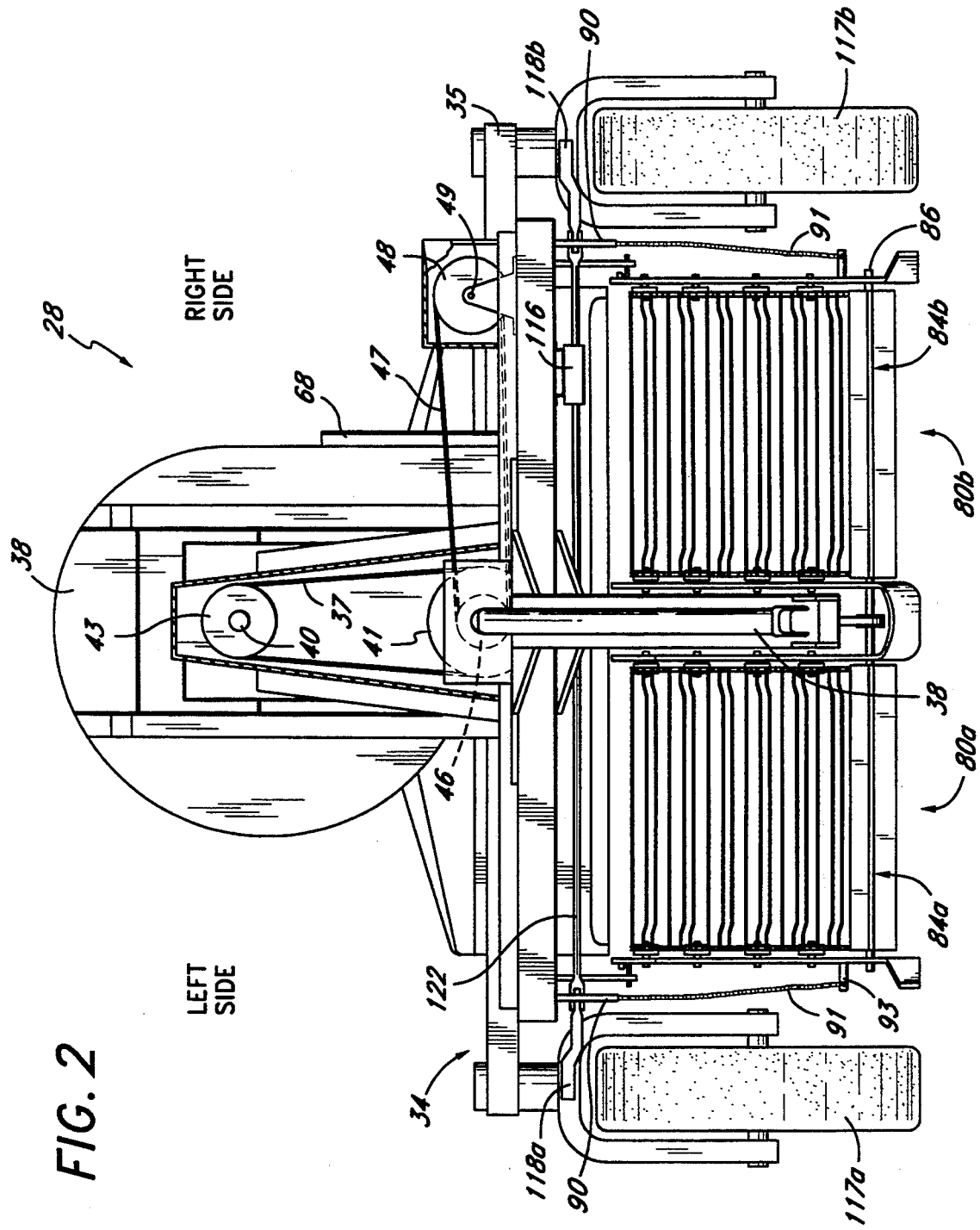
FIG. 2 is a front elevational view of the vegetable topper.

Referring to FIGS. 1–11, but primarily to FIG. 1, the vegetable topper 28 comprises a hydraulic system 31 (FIG. 12), sickle blade 72, conveyor system 32, vacuum system 30, and support frame 34 on which the above components are mounted. Preferably, the vegetable topper 28 is pulled by a tractor (not shown) through the field via the towing draw bar 36. As used herein, "right" and "left" refer to the respective sides of the vegetable topper 28 as viewed when the tractor driver looks at the topper 28, as indicated in FIG. 2.

The structural portion of the frame 34 comprises a chassis 35 (FIG. 5), preferably made of rectangular steel tubing for strength and durability. The towing draw bar 36 angles downward from the center of the front end of the chassis 35 to a hitch behind a tractor (not shown). The hitch is preferably seventeen inches above the ground, and the chassis 35 rides approximately three feet above the ground to provide the necessary clearance to accommodate the conveyor system 32, as described more fully below. The fixed angle of the towing draw bar 36 allows the chassis to ride high above the field of onions 20 while the topper 28 is pulled by the tractor from the relatively low hitch.

The vegetable topper 28 draws mechanical power from a power take-off (PTO) assembly at the rear of the tractor. A PTO shaft 38 extends from the rear of the tractor to the front of the topper 28 parallel to, and supported by, the towing draw bar 36 for stability. The PTO shaft 38 is turned by the tractor motor and couples to a first shaft 39 onto which an 8-sheave pulley 41 and a double sheave pulley 46 are mounted and keyed. The shaft 39 is rotatably mounted on the support frame 34 of the topper 28 by means well known in the art. The PTO and flexible coupling mechanism are known in the art and will not be described further herein.

The vegetable topper 28 is designed to consolidate a number of rows of topped onions 20 into a portion of the original area. Commonly, two beds are merged into one, but, depending on the size of the equipment and the size of the beds, combining four rows into two, or perhaps more, are possible. The merging is accomplished by a conveyor system 32. Referring to FIGS. 1–4 and 6–7, but primarily to FIG. 7, the conveyor system 32 comprises two inclined pick-up conveyors 80a,b, two onion pick-up flappers 84 at the front end of conveyors 80, and a rear chute 100 at the rear of the conveyors. Alternatively, the chute can be replaced by a cross-over chain conveyor for delivery to a vehicle.

The parallel pick-up conveyors 80a,b each have a width about equal to half the width of the moveable frame 34, or about the width of one bed. Preferably the pick-up conveyors 80a,b have a width of approximately thirty inches and have a gap of approximately eight inches therebetween, for a total span of sixty-eight inches. The pick-up conveyors 80a,b depend from the underside of the frame 34, and have a length which extends from the rear of the frame to proximate the front end of the frame. Each conveyor 80a or 80b is constructed in two sections, rotatable relative to each other.

A fixed section 81 mounts below the rear end of the frame 34 in a generally horizontally plane and extends from the rear end of the frame a distance of approximately eighteen inches forward. An adjustable section 82 extends from the front end of the fixed section 81 approximately forty-eight inches farther forward. The rear of the adjustable section 82 is rotatably connected to the front of the fixed section 81 by, for example, pins 83 through overlapping side walls 92. The front of the adjustable section 82 may be raised or lowered as will be described more fully below. In its raised position, the adjustable section 82 aligns with the fixed section 81 in a horizontal plane below the frame 34 to allow a clearance underneath of approximately one foot.

The two pick-up conveyors 80a,b comprise identical parts and are mirror images of each other across the longitudinal centerline of the topper 28, thus only one conveyor 80a will be referred to. A plurality of thin metal rods or pick-up ribs 94 extending between two sidewalls 92 comprise the belt of the pick-up conveyor 80a. The pick-up sidewalls 92 comprise side borders for the pick-up conveyor 80a to prevent the onions from falling off. The pick-up sidewalls 92 are sheet metal strips mounted along the outer length of the pick-up conveyor 80a with a height above the pick-up ribs 94 approximately equal to the maximum diameter of onion bulb 21. The sidewalls 92 of the fixed section 81 mount to the frame by bolts (not shown) or other means well-known in the art. A conveyor drive shaft 98 extends through the rear ends of the sidewalls 92 of the fixed sections 81 of both conveyors 80a,b and is also rotatably mounted to the frame. As previously mentioned, pins 83 rotatably couple the rear end of the sidewalls 92 of the adjustable section 82 with the front ends of the sidewalls of the fixed section 81. A flapper axle 86 extends through the front ends of the sidewalls 92 of the adjustable sections 81 of both conveyors 80a,b.

Figure 6:
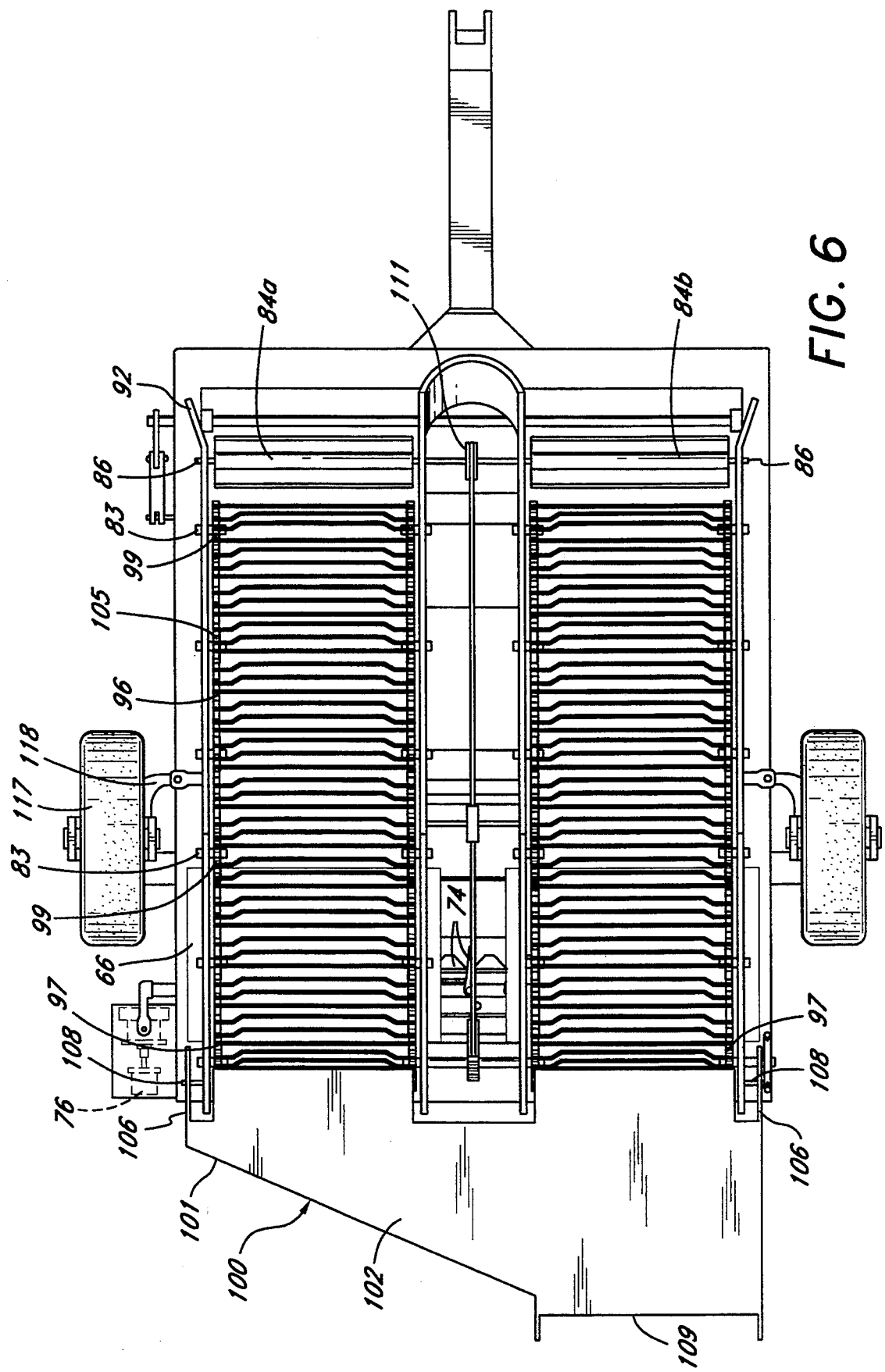
FIG. 6 is a bottom view of the vegetable topper.
Figure 7:
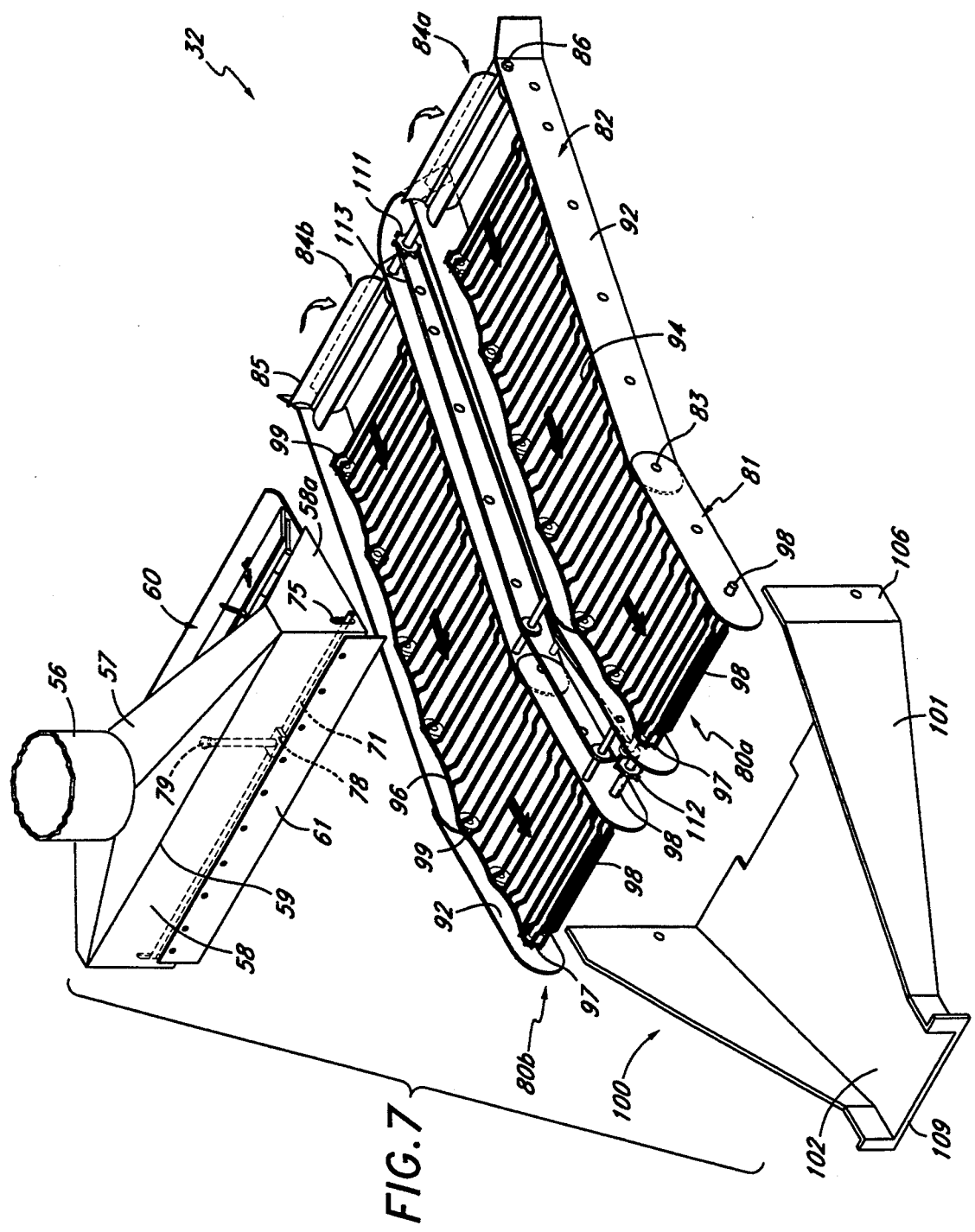
FIG. 7 is a perspective view of the conveyor system and vacuum hood of the vegetable topper.
Figure 8:
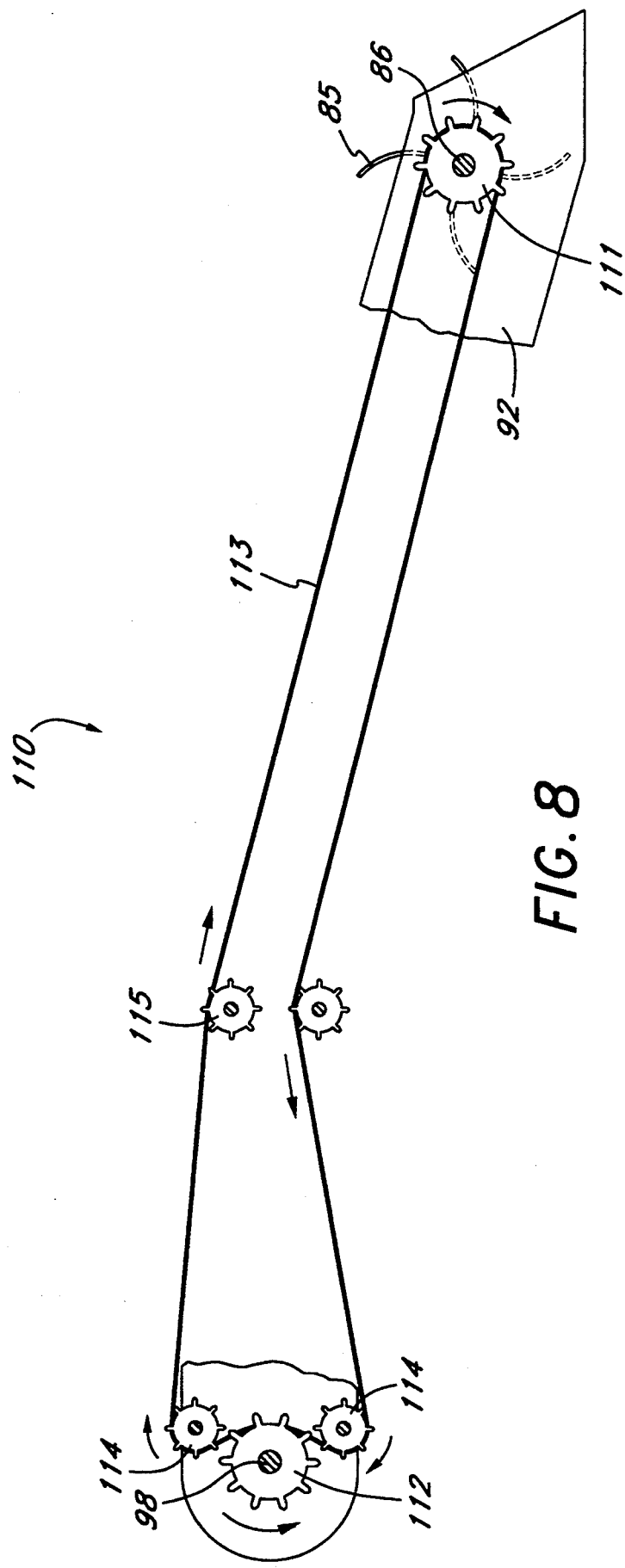
FIG. 8 is a schematic view of the flapper drive mechanism.

Referring to FIG. 6 and 7, sprockets 97 keyed to drive shaft 98 drive two conveyor chains 96 just within both sidewalls 92. The ends of the pick-up ribs 94 are fixed to the conveyor chains 96 and thus move with the chains upon rotation of the drive shaft 98. The conveyor chains 96 pass over two sets of slave sprockets 99 rotatably mounted on pins 83, one at the interface between the fixed and adjustable conveyor sections 81, 82, and the other at a position slightly rearward from the extreme front end of the adjustable section. Thus the conveyor chains 96 are driven at the rear and follow the contour of the fixed and adjustable sections 81, 82. In this regard, the conveyor chains 96 also pass over a plurality of rollers 105 to provide support for the chain 96, ribs 94, and onions 20, along the conveyor length to eliminate sagging.

Two out of every three pick-up ribs 94 have a middle portion that is bent downward. Stated another way, the pick-up ribs have lowered midsections for the onion bulbs 21 to ride in. Each third pick-up rib 94 extends horizontally straight across the pick-up sidewalls 92 without bending. The straight third ribs 94 serve to push the onions up the inclined adjustable section 82, without bruising the bulbs 21.

Figure 4:
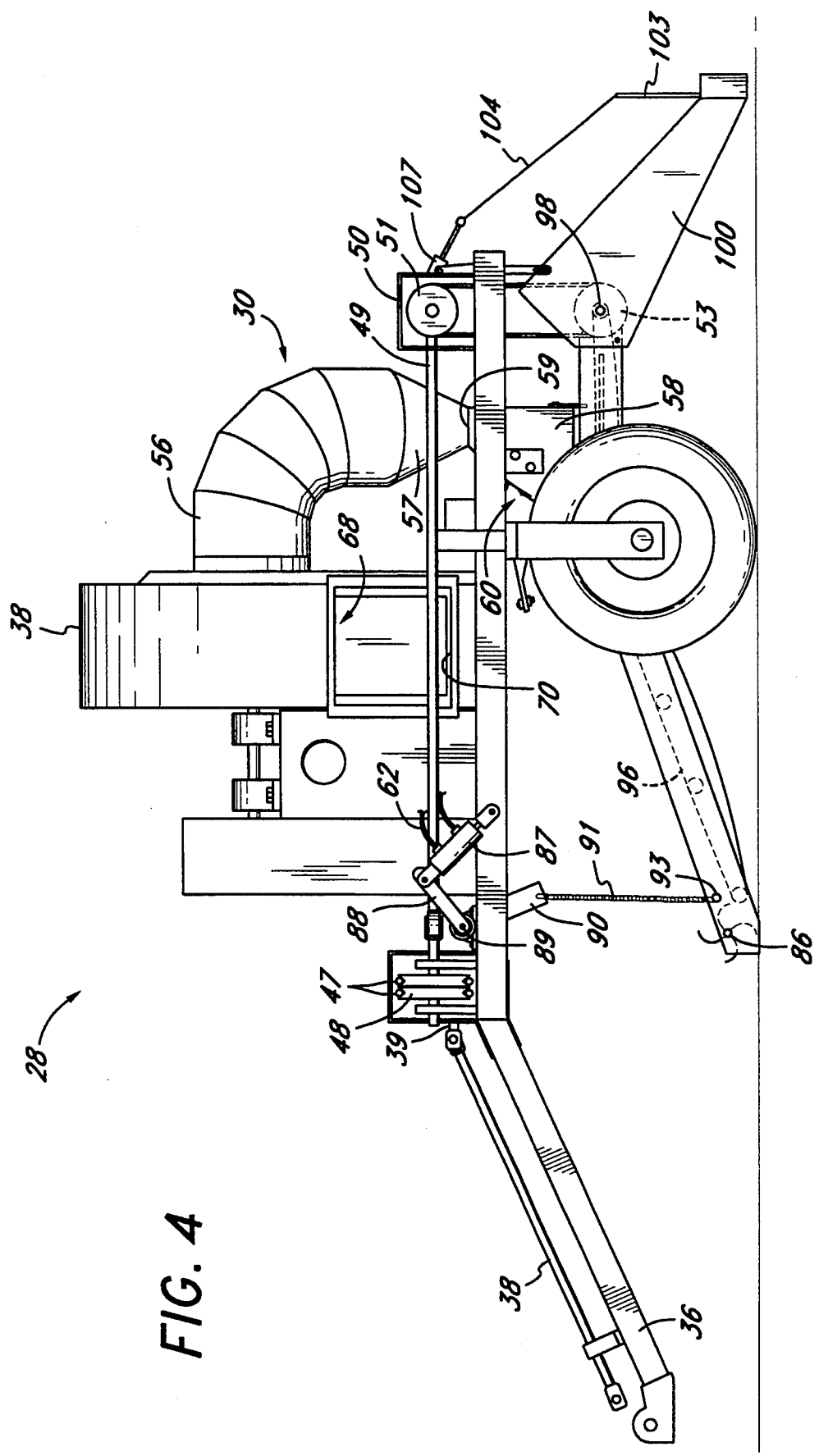
FIG. 4 is a right side view of the vegetable topper.

As seen best in FIGS. 2 and 4, a pick-up lift piston 87 alternately lifts and lowers the front end of the adjustable section 82 of both pick-up conveyors 80a,b in tandem to control ground clearance. The piston 87 is connected to a lever 88 that is rigidly connected to one end of a shaft 89 extending across and rotatably connected to the frame 34. A pair of tangs 90 extend radially from shaft 89 at each side of the frame, with a flexible connector, such as chain 91, connecting the distal end of each tang to extensions 93 mounted proximate the front end of the conveyor side-walls 92. The flapper axle 86 is rotatably supported by bearings in the side-walls 92 of both conveyors 80a,b, resulting in a rigid coupling of the front ends of both conveyors so that they are lifted in tandem. As the piston 87 extends or retracts, it causes lever 88 to rotate shaft 89, which moves tangs 90 to cause the chains 91 to raise or lower the front end of the adjustable sections 82 of the pickup conveyors 80a,b, depending on the motion of piston 87. The pick-up lift piston 87 is in fluid communication with, and powered by, the hydraulic pump by means known in the art and not described in detail herein. When engaged, the front ends of both conveyors 80a,b are proximate the ground at the front of the frame 34.

Figure 3:
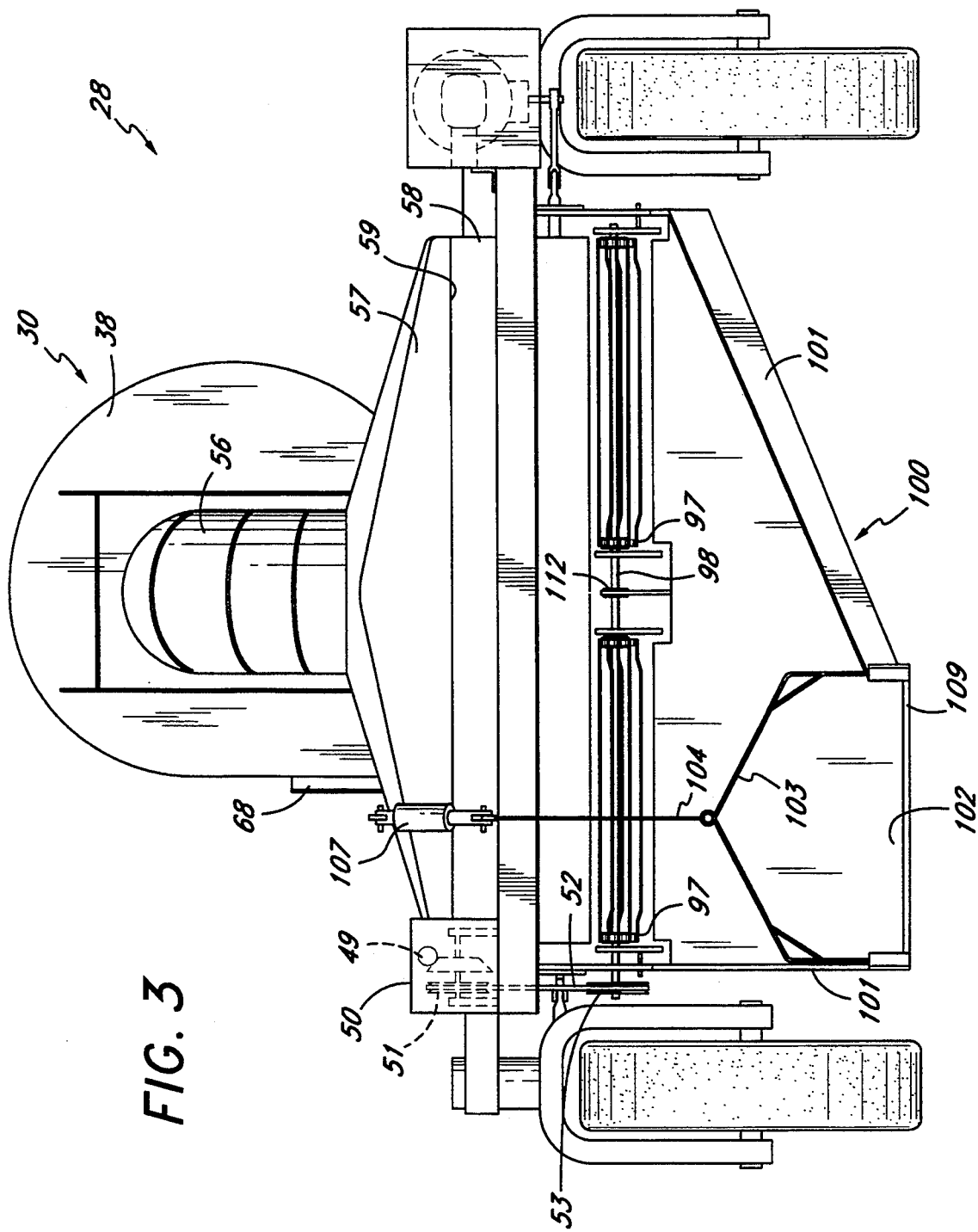
FIG. 3 is a rear elevational view of the vegetable topper.

Referring to FIGS. 2, 3 and 4, the pick-up conveyors 80a,b are driven via a drive train ultimately powered by the PTO from the tractor. The double sheave pulley 46 keyed to the drive shaft 39 turns belts 47. The belts 47 are in the vertical transverse plane and extend around the sheaves of the pulley 46 to drive a second pulley 48 rotatably mounted at the front right corner of the frame 34 of the vegetable topper 28. The second pulley 48 is keyed to an elongated shaft 49, rotatably supported on the right side of the frame 34. The elongated shaft 49 extends from the front corner of the frame 34 into a gear box 50 rigidly mounted at the rear right corner of the frame. The shaft 49 includes gear teeth (not shown) for meshing engagement with an internal shaft of the gear box 50. The coupling of the elongated shaft 49 and an internal shaft of the gear box 50 may be accomplished in many different ways, and the present invention is not limited to that disclosed. The gear box 50 has an internal mechanism which changes the rotational axis of an input rotary motion 90 degrees. Such internal mechanisms are well known in the art and will not be described further herein. The gear box 50 has an output pulley 51, oriented with a horizontal transverse axis of rotation. A belt 52 couples the output pulley 51 with a pick-up conveyor drive pulley 53 mounted and keyed to the conveyor drive shaft 98. The drive shaft 98 powers both conveyors 80a,b through sprockets 97 and drive chains 96. The drive shaft 98 simultaneously provides power to the flappers 84.

As best seen in FIG. 7, and also in FIGS. 2 and 6, two rotating flappers 84 are located just in front of the front end of each pick-up conveyor 80a,b. The flappers 84 are keyed to the flapper axle 86 which extends across the width of both pickup conveyors 80a,b. A flapper chain drive system 110, shown schematically in FIG. 8, extends between the two conveyors 80a,b and couples a gear 111 at the middle of axle 86 to a drive gear 112 on the conveyor drive shaft 98 to rotate the flappers 84 with a 1.5 speed reduction. Each flapper 84 comprises a plurality of rectangular rubber flaps or flexible cross flights 85 mounted to, and extending radially from, the axle 86. The flaps 85 are about the same width as each onion bed being traversed and are wide enough and stiff enough to move the onions 20 from each bed onto the conveyors 80a,b.

The flapper chain drive system 110 couples the primary drive gear 112 to the flapper drive gear 111 via an elongated chain 113. The chain 113 extends between the pickup conveyors 80a,b and around two idler sprockets 114 and the flapper drive gear 111. A set of sprockets 115 disposed at the junction of the fixed 81 and adjustable 82 sections of the conveyor 80 support the middle portion of the elongated chain 113. The direction of rotation of the chain 113 is opposite that of the primary drive gear 112. In this context, the chain 113 passes over the two idler sprockets 114 mounted to the frame 34 above and below the front side of the primary drive gear 112. The path of the chain 113 around the idler sprockets 114 forces the outside edge of the chain to couple with the front side of the primary drive gear 112, thus turning the chain 113 in a direction opposite the drive gear 112.

The flaps or cross flights 85, described above, lift the untopped onions 20 onto the front of the pick-up conveyors 80a,b. The onion bulbs 21 ride up the adjustable inclined sections and then along the horizontal sections of the pick-up conveyors 80a,b, and are deposited onto the rear chute 100 located toward the rear of the vegetable topper 28 and below the rear end of pickup conveyor 80. The front end of chute 100 is wider than the rear end to form a funnel.

Referring to FIG. 3, the rear chute 100 comprises two side walls 101, a slide 102, a lift bracket 103 and a lift chain 104. The slide 102 comprises a flat sheet metal bottom portion of the chute 100 on which the onion bulbs 21 ride down into proximity with the ground. The side walls 101 are generally vertically oriented sheet metal strips integral with, or welded along the outer length of both edges of, the slide 102. Looking from below in FIG. 6, two extensions 106 at the farthest forward end of the side walls 101 receive pivot pins 108 mounted at the rear end of the conveyors 80. Also seen in FIG. 6, the slide 102 extends underneath the width of both pickup conveyors 80a,b, and then narrows to a width of only one onion bed at the rear exit 109. The chute 100 thus channels the topped onions 20, which fall off the rear end of both pickup conveyors 80a,b, from two onion beds to a width of one onion bed.

Referring to FIGS. 1, 3 and 4, the rear ends of the pick-up conveyors 80a,b overlie the front of the rear chute 100, and the onion bulbs 21 transfer to the rear chute at this junction. The side walls 101 comprise side borders for the rear chute 100 to prevent the onions 20 from falling off the rear chute. Accordingly, the side walls 101 have a height above the slide approximately equal to the maximum diameter of onion bulb 21. The chute 100 preferably descends to a position above the middle of one of the adjacent onion beds so that the onion bulbs 21 are then deposited by the chute 100 over a smaller area than the onion bulbs were distributed initially. Referring to FIG. 3, onion bulbs 21 falling on to the chute 100 from the conveyors 80 leave the rear exit 109 over the left bed as seen from the rear of the topper 28. The converging or funnel shape of rear chute 100 allows two beds of onions 20 to be combined into one bed for easier pickup. As many farmers do not have multi-bed pickup equipment, this feature is very helpful. Since the onions 20 are deposited from a low height back to the ground, their impact with the hard ground is minimized, thus reducing the risk of bruising the onions 20.

The chute 100 is pivotally mounted to the frame 34 by extensions 106 and pins 108 such that the vertical position of the rear exit 109 of the chute can be moved relative to the ground. A hydraulic piston 107, mounted to the rear of the frame 34, has one end connected to the lift chain 104 which in turn is connected to the lift bracket 103 over the rear end of chute 100. The lift bracket 103 rigidly fixes to both side walls 101 and extends upward a distance sufficient to clear the stream of onions 20 descending the chute 100 before joining at a central point. The piston 107 is in fluid communication with the hydraulic system 31. As the hydraulic system 31 causes the piston 107 to extend and retract, the rear exit 109 of chute 100 is moved vertically in order to alter the height at which onions 20 leave the chute. The location at which the onions 20 are deposited over one of the adjacent beds may be adjusted based on customer preference.

Referring to FIGS. 1, 3, 4 and 5, the vacuum system 30 lifts the tops 22 of the onions 20 for cutting. The vacuum system 30 comprises a high pressure, high velocity fan unit 38 driven by drive shaft 40, and an intake manifold 56 extending from the fan intake side terminating in a vacuum hood 58. The PTO drives the fan unit 38 via horizontal shaft 40. An 8-sheave pulley 43, disposed at the front of the vegetable topper 28, has an axis of rotation parallel to the longitudinal axis of the topper 28. The pulley 43 is mounted and keyed to the drive shaft 40 which drives the fan blades 55 of the vacuum system 30. The pulley 43 is connected to, and derives power from, the 8-sheave pulley 41 driven by the PTO via first shaft 39. Eight flexible belts 37 provide the rotational coupling between the two 8-sheave pulleys 41, 43.

Between the PTO and fan unit 38, and in line with the first shaft 39, is a free-wheel friction clutch 42 for engagement and disengagement of the fan 38. Clutches of this type are well known in the art and function to transmit power when a torque is applied, but free-wheel when the torque is removed. In other words, when the PTO is engaged and transmitting torque, the clutch is engaged and the fan drive shaft 40 is powered. When the PTO is disengaged, the clutch 42 disengages, and the fan blades 55 rotate under their own inertia without coupling to the PTO shaft 38 and putting drag on the tractor PTO mechanism.

Referring to FIG. 1, the fan unit 38 comprises an outer cylindrical housing, or drum 54, within which a plurality of fan blades 55 rotate. The centerline of the fan 38 and axis of rotation of the fan blades 55 are coincident with the axis of the horizontal drive shaft 40. While there is an inch or more clearance between the outer edges of the fan blades 55 and the adjacent enclosing housing 54, the rotation of the fan blades 55 within the housing creates a powerful suction within the intake manifold 56 and vacuum hood 58. The construction of the fan blades, or paddles 55, relative to the housing 54, and the rotational speed of the fan blades, are such that the tops 22 of the onions are chopped into small pieces, few of which are larger than 1 or 2 inches long, and most of which are much smaller. If the tops 22 are dry, many of the particles exit as dust and small flakes.

A blower built by Fan Engineering Co., Huntington Beach, Calif., size 0-21, type 1E, has been found suitable for use as to fan unit 38, and the details of the construction of that fan unit are incorporated here by reference. This blower unit has a drum 54 about 5 feet in diameter, and 6 fan blades 55 that are about 12×16 inches in size. Advantageously, the fan blades 55 rotate at about 1750 rpm when the topper 28 is traveling at about 3.5 mph, although the blades may rotate up to about 2100 rpm in wet fields of green onions, and as low as about 1200 rpm in very dry fields of onions.

Referring to FIGS. 3, 4 and 7, the intake manifold 56 is generally cylindrical in cross section, about 22 inches in diameter, and extends from the center of the flat rear of the drum 54 before bending downwardly to contact an adaptor 57. The adaptor 57 connects the circular intake manifold 56 with a rectangular shaped throat 59, which is about 5 inches wide and as long as the topper 28 is wide (about 7 feet). The throat 59 is about 12 inches below the end of the circular intake manifold 56. The bottom of the adaptor 57 abuts the top of a vacuum hood 58.

As best seen in FIG. 7, the vacuum hood 58 expands outward from the throat 59 to a larger, concentric rectangular shaped hood which is about one foot wide and again extends across the width of the topper 28. The rear wall of vacuum hood 58 extends vertically downward while the front wall angles forward to expand the area of suction from the circular cross-sectional area of the intake manifold 56 to a generally rectangular region large enough to encompass a plurality of onion beds. The vacuum hood 58 continues down from the adaptor 57 to just below the support frame 34 (see FIG. 1). The downward facing rectangular aperture defined by the lower edge of the vacuum hood 58 is disposed at the rear of the support frame 34.

Now referring to FIGS. 7 and 9, the vacuum hood 58 of the present invention is capable of providing optimum uniform suction sufficient to lift the tops 21 into a suitable cutting position. The hood 58 is wide enough to provide room to lift the tops 22 of the onions 20. Preferably, an adjustable plate assembly 60 pivots about a horizontal transverse axis at the lower front of vacuum hood 58. The plate assembly 60 may be adjusted to vary the vacuum force lifting the tops 22 of the onions 20 to accommodate onions of various sizes and moisture content while minimizing the vacuum power lost under the front edge.

Figure 11:
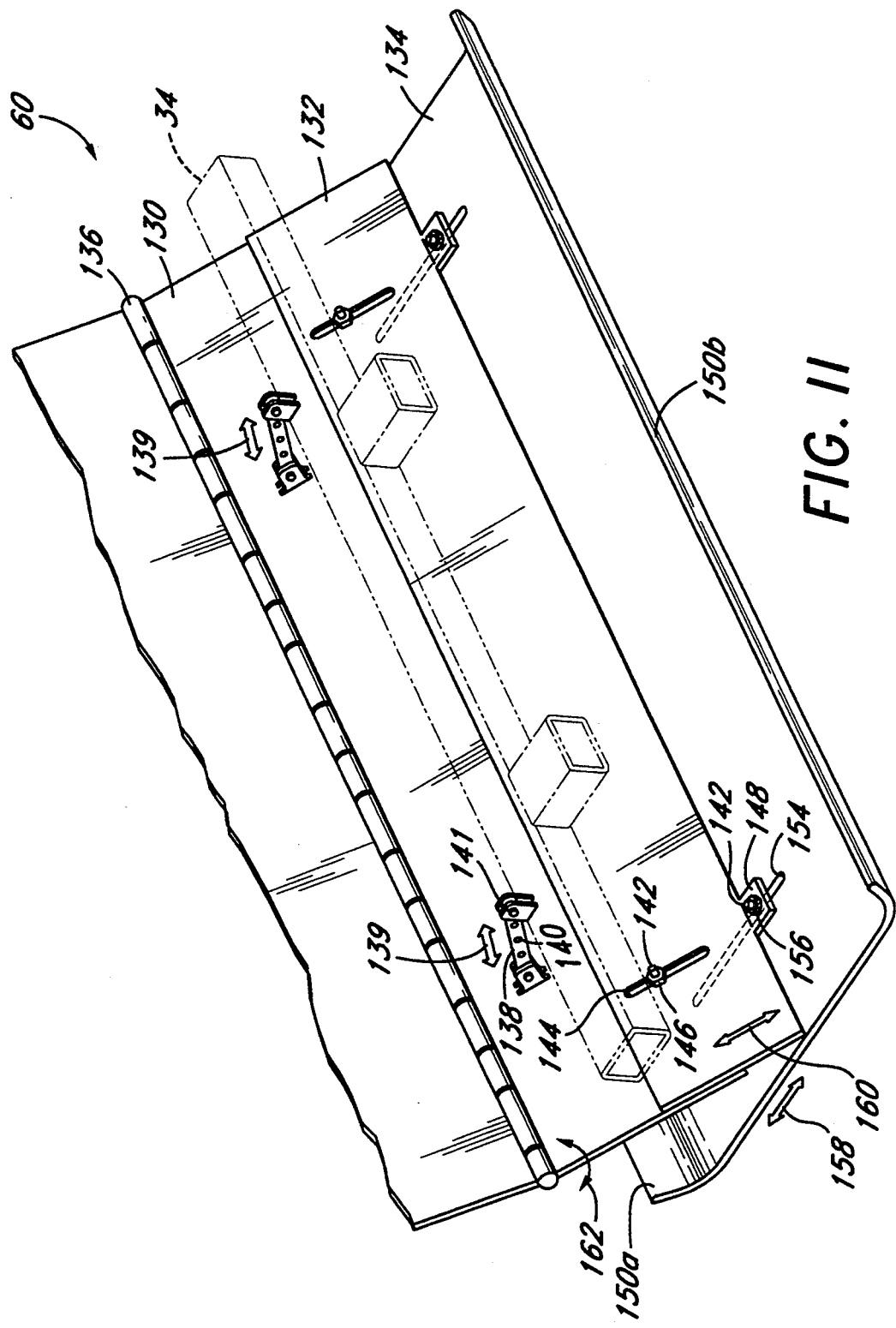
FIG. 11 is a perspective view of the adjustable plate assembly.

As seen from the side in FIG. 9, and in perspective in FIG. 11, the adjustable plate assembly 60 generally comprises an upper swinging plate 130, an intermediate member 132, and a lower generally horizontal air deflection plate 134, all releasably secured together. The elongated upper swinging plate 130 extends across the width of the vacuum hood and pivots about a hinge 136. One or more connecting braces 138 having a row of adjustable holes 140 therein are hingedly mounted to the front side of the swinging plate 130. Corresponding fixtures having adjustment bolts 141 mounted on the support frame 34 cooperate with the holes 140 in each of the connecting braces 138 to provide a swinging adjustment of the plate 130, as shown by arrows 139.

A pair of fixed threaded studs 142 are welded to and project normally from the front side of the upper swinging plate 130. The intermediate member 132 overrides the swinging plate 130 with a pair of slotted openings 144 receiving the threaded studs 142. Fasteners 146 fix the intermediate member 132 over the upper swinging plate 130 in any overlapping configuration that the threaded studs 142 and slotted openings 144 will allow. Thus, the intermediate member 132 depends from the lower edge of the swinging plate 130 and may be raised or lowered, as shown by the arrow 160, by loosening the fasteners 146, sliding the member along the threaded studs 142 and then retightening the fasteners.

A plurality of angled connecting tabs 148 are welded to the lower edge of the intermediate member 132. A throughhole (not shown) in each of the connecting tabs 148 receives a bolt 152 from below which first extends through an elongated slot 154 in the lower air deflection plate 134. Conventional nut and washer combinations 156 secure the lower plate 134 to the connecting tabs 148 of the intermediate member 132. The elongated slots 154 provide for relative movement between the lower air deflection plate 134 and intermediate member 132, as shown by an arrow 158.

As best illustrated in FIG. 9, a wind tunnel is created through which the conveyor ribs 94 carry the onions. Upturned ends 150a,b on the lower air deflection plate 134 help create a positive laminar air flow through and over the onions 20. The improved air flow orients the onions 20 and tops 22 into air tunnel or vacuum hood 58 to more effectively sever the tops. The various couplings of the hinge 136, hinged plate 130 and intermediate member 132 allow the deflection plate 134 to move in the direction of the arrows 158, 160, 162 relative to the topper frame 34. The intermediate member 134 can be moved in a direction of the arrows 160 and the upper plate 130 can be swung in the direction of the arrows 162. The variety of movement of the adjustable plate assembly 60 completely controls the air flow based on the size of the onions 20 and the weight density of its tops 22.

The orientation of the plate assembly 60 is manually adjusted to meet the needs of growers. For instance, light dry mature tops 22 require the deflection plate 134 to be closer to the cutting blade 72. Greener dense tops 22 require the plate 134 to be moved back in the opposite direction to allow more room at the blade 72 for the tops to maneuver. The plate 134 is raised higher when harvesting large onions 20 than when topping small onions. Large dry top onions may be more efficiently cut with a different positioning of the plate assembly 60 than for large greener onions. The same can be said of small dry top onions versus small greener onions. The characteristics of the onions being harvested can change on a daily basis depending on the weather and humidity.

To further accentuate the effect of the adjustable plate assembly 60 and minimize vacuum losses, several impediments exist to help channel air flow under the front of the vacuum hood 58. The rear wall of the vacuum hood 58 comprises a rigid upper portion with a flexible rubber flap 61 depending from the rigid portion. Thus, the back of the air chamber has the rubber flap 61 which controls or otherwise seals off the air flow under the back of the hood 58. The flap 61 is preferably bolted to the hood 58 along its length and extends downward into proximity with the conveyor ribs 94 at its lower edge, substantially preventing air from entering under the rear edge of the hood while, at the same time, being flexible enough to allow onions 20 to pass underneath without bruising them. In addition, the plastic barriers 66 provide a constant lower boundary for the vacuum air flow. The barriers 66 extend beyond the lower periphery of the vacuum hood 58 to more effectively focus the air flow under the adjustable plate assembly 60.

Referring to FIGS. 1 and 9, a vacuum tunnel under the lower front edge of the hood 58 is further enhanced by the addition of vacuum plates or air barriers 66 under the conveyor ribs 94. The barriers 66 mount to the same structure supporting the fixed section 81 of the conveyors 80, and are horizontally disposed between the upper and lower belts of conveyor ribs 94. As seen partially in FIG. 6, the barriers 66 extend wider than the conveyors 80 and substantially span the length of the fixed sections 81. In this regard, the barriers 66 effectively obstruct air from entering the vacuum hood 58 from directly below and thus increase the flow of air under the front edge of the hood. Sheets of ultra-high molecular weight plastic may be used as material for the air barriers 66 to increase their wear life.

The vacuum system thus provides a means for exerting a substantially uniform suction so that the onion tops 22 are lifted into a position suitable for cutting. There is sufficient suction across the span of the two conveyors 80a,b to effectively lift the onion tops 22 vertically to contact the sickle blade 72 and also to pick up rotted or undersized onions 20. As stated above, a vacuum tunnel is formed by the various barriers to air flow so that a majority of the air flow enters the hood 58 under the front plate assembly 60. Advantageously, the area of suction under the front edge of the hood 58 can be altered based on varying onion 20 sizes by the several plate assembly 60 adjustment means. Optimally, the plate assembly 60 just clears the largest onion 20 to maximize the amount of suction under the front edge of the hood 58 without pinning onions between the hood and the pick-up ribs 94. The suction under the front edge of the hood 58 is preferably maximized in such a manner to facilitate the rotation of the onions 20 into a position where the tops 22 are substantially vertical and can be sheared off cleanly.

As seen in FIGS. 7, 9 and 10, the sickle blade 72 adjustably mounts transversely across the bottom rear of the vacuum hood 58. The sickle blade generally comprises abutting rows of movable teeth 74a and fixed teeth 74b (FIG. 6) which face forward to come in contact with the raised onion tops 22. The teeth 74a are slidingly mounted on an elongated rod or beam 71 which spans the width of the vacuum hood 58 and extends through vertical slots 75 in the side walls 58a of the hood. Positioning nuts 73 thread on the ends of rod 71 to tighten against the hood side walls 58a and fix the rod at a certain height with respect to the slots 75. The nuts 73 may be loosened to raise or lower the sickle blade 72, and then tightened to hold the blade at a desired height. Advantageously, for cutting the tops of uprooted onions 20, the sickle blade 72 is adjustable between four and seven inches above the conveyor. Preferably, a vertical adjustment bolt 79 extending through the top of the hood 58 threadingly engaging carriage 78 fixed to the rod 71 facilitates accurate positioning of the sickle blade 72 after the nuts 73 are loosened.

Figure 5:
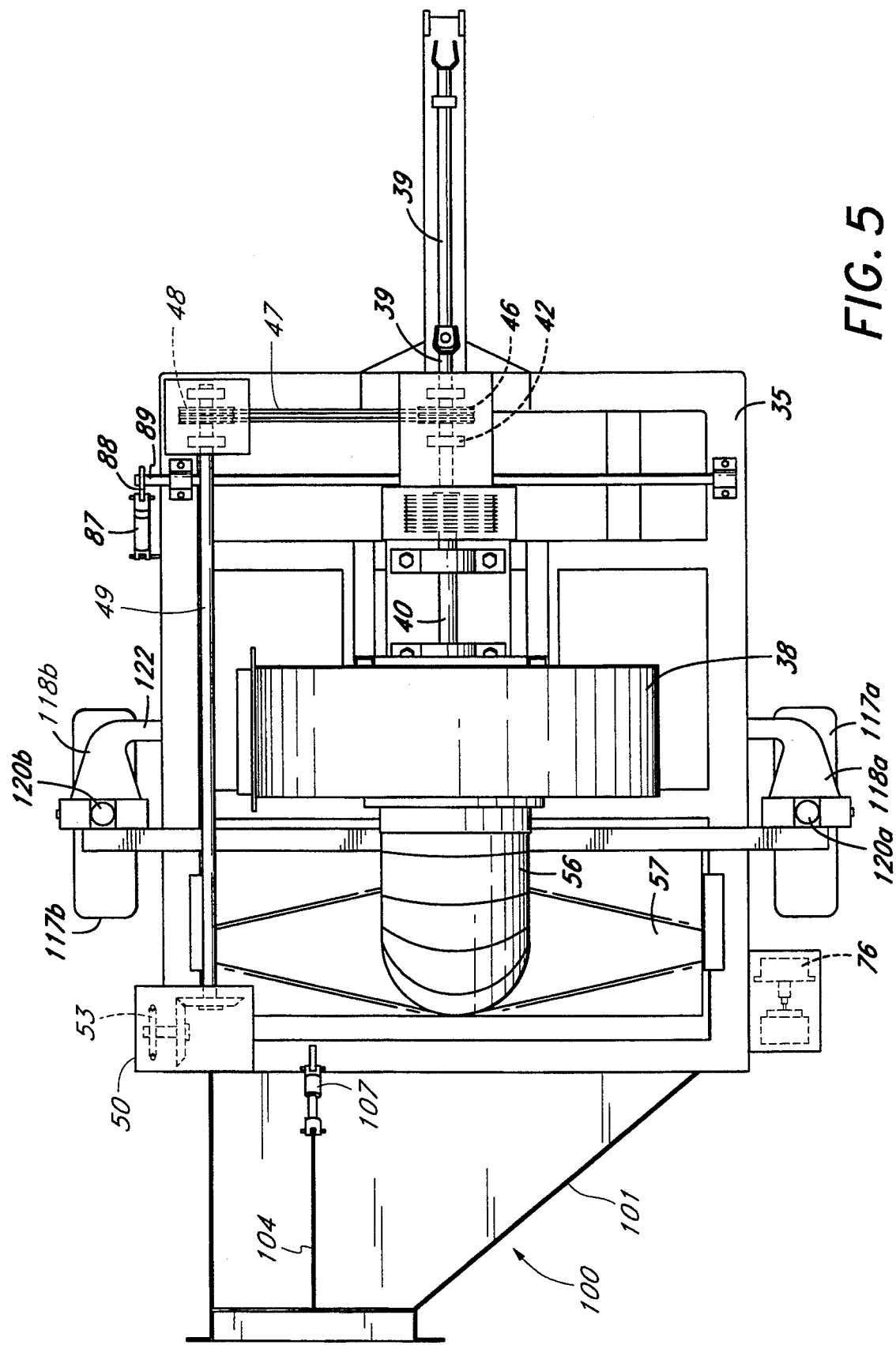
FIG. 5 is a top plan view of the vegetable topper.

As seen in FIGS. 1 and 9, the sickle blade 72 is preferably at or just a little behind the center of the manifold 56 and the center of throat 59. More preferably, the front edges of the sickle blade teeth 74 extend three inches into the vacuum hood 58 from the rear wall. A hydraulic sickle actuating motor 76 is fixed to the frame 34 proximate one end of the sickle blade 72 (FIGS. 1 and 5).

The sickle actuating motor 76 causes one row of teeth 74a to slide transversely relative to the other 74b, resulting in a dual shear or scissor-like action which cuts or snips off the tops 22 of the onions 20 between the blades 74. The sickle actuating motor 76 is in fluid communication with, and powered by, the hydraulic pump by means known in the art and not described in detail herein. A 6-cubic inch displacement Vicars hydraulic motor with an 800 rpm average operating speed has been found suitable for the sickle actuating motor 76 when the vegetable topper 28 is moving at about 3.5 mph. The speed of the sickle may be varied by motor 76 to accommodate different speeds of topper 28, different maturity of onions 20, and varying amounts of seeders and wetness.

Advantageously, the sickle blade 72 is oriented parallel to the fixed section 81 of the conveyors 80, which are advantageously parallel with the ground. The sickle teeth 74 are angled so that when the onion tops 22 are sucked upwards, the tops 22 are cut substantially square to the onion 21 such that if the onion 21 and the top 22 were vertical, the cut would be horizontal. A majority of the onions 20 are rotated so that their tops 22 are lifted vertically by the force of the vacuum.

Other advantageous features of the sickle blade 72 of the present invention are its enhanced cutting efficiency, longer life and self-sharpening capability. Each tooth 74a preferably has only seven serrations per inch, reducing the frequent clogging associated with finer serration teeth. The larger serrations have greater structural strength than smaller serrations, and thus hold their edges longer. The teeth 74 are bolted on for easy replacement if worn. Special hold down clips extend farther out toward the tip of each tooth 74a preventing tough-to-cut material from raising the tooth, thus ensuring a cleaner cut. Preferably, the teeth 74 are a Super 7 Section model manufactured by Herschel.

Referring to FIG. 1, as the vegetable topper 28 moves forward, and the onions are conveyed under the vacuum hood, the vacuum system 30 lifts the tops 22 of onions 20 and sickle blade 72 cuts them off. The vacuum is sufficiently strong that it will rotate onions 20 to enable the tops 22 to be cut, but the suction is not so great that it will lift the onion bulbs 21 into the cutting blade so as to damage the bulbs 21, unless the onion 20 are substantially smaller than the adjacent onions or unless the bulbs 21 are rotted, and thus lighter in weight than healthy onion 20. The severed tops, and any lighter onions 20, are sucked up through the vacuum hood 58 and intake manifold 56 into the fan 38. The tops and any light onions are cut, torn, or mulched by the rotary fan blades 55, and discharged out a rectangular exit port 68 (FIG. 4) in the side of the fan 38. The fan blades 55 are of such a construction that, when run at an appropriate speed for the type and density of plant tops entering the drum 54, the fan blades 55 cut, tear or chop the tops and light onions into a mulch. As the onion tops 22 are preferably dry when cut, most of the mulch will take the form of fine particles and dust which may extend in a dust cloud extending some 20 feet from the exit port 68 of the fan 38, thus spreading the tops 22 uniformly over a large area.

Advantageously, the bottom of the exit port 68 is covered with a non-stick liner 70, such as plastic, to which the wet tops 22 will not stick, in order to eliminate any clogging from the tops 22, particularly with wet crops. The bottom portion of the exit port 68 is important to prevent clogging if the onion tops are too wet, but additional benefit is obtained by fixing stick-resistant liners 70 on the sides of the exit port 68 with non-stick materials as well. The lining may advantageously extend up the sidewalls of the drum 54 adjacent the exit port 68, but need not overlap much with the area immediately adjacent the sides of the rotating fan blades 55. Tests by a purchaser of one of an early prototype found that Teflon ® works well as a lining material.

Referring to FIGS. 2 and 5, two steerable wheels 117 rotatably mount to the outside of frame 34 just forward of the vacuum hood 58. A steering piston 116 (FIG. 2) controls the turning angle of the wheels 117. The steering piston 116 mounts under the frame 34 in front of the vacuum hood 58. The steering piston 116 is connected to, and powered by, the hydraulic pump by means known in the art and not described in detail herein. The steering piston 116 rotates a steering arm 118a which has as its pivot a vertical strut 120a of one wheel 117a. A second steering arm 118b, which has the vertical strut 120b of the opposite wheel 117b as its pivot, moves in tandem with the first steering arm due to the action of a connecting rod 122 which extends between, and coordinates the motion of, steering arms 118.

The vegetable topper 28 can make extremely tight turns due to the simultaneous steering of the wheels 117 by piston 116. Additionally, the vegetable topper 28 has a much shorter wheelbase than devices of the prior art. The advantageous positioning of the fan and vacuum/-sickle hood over the pickup conveyors 80 reduces the overall length of the frame 34. Further enhancing turning capabilities, the pick-up conveyors 80 and rear chute 100 may be lifted from the ground during turns to eliminate scraping. The vegetable topper 28 thus is only limited in its turning ability by the turning radius of the tractor pulling it.

Figure 12:
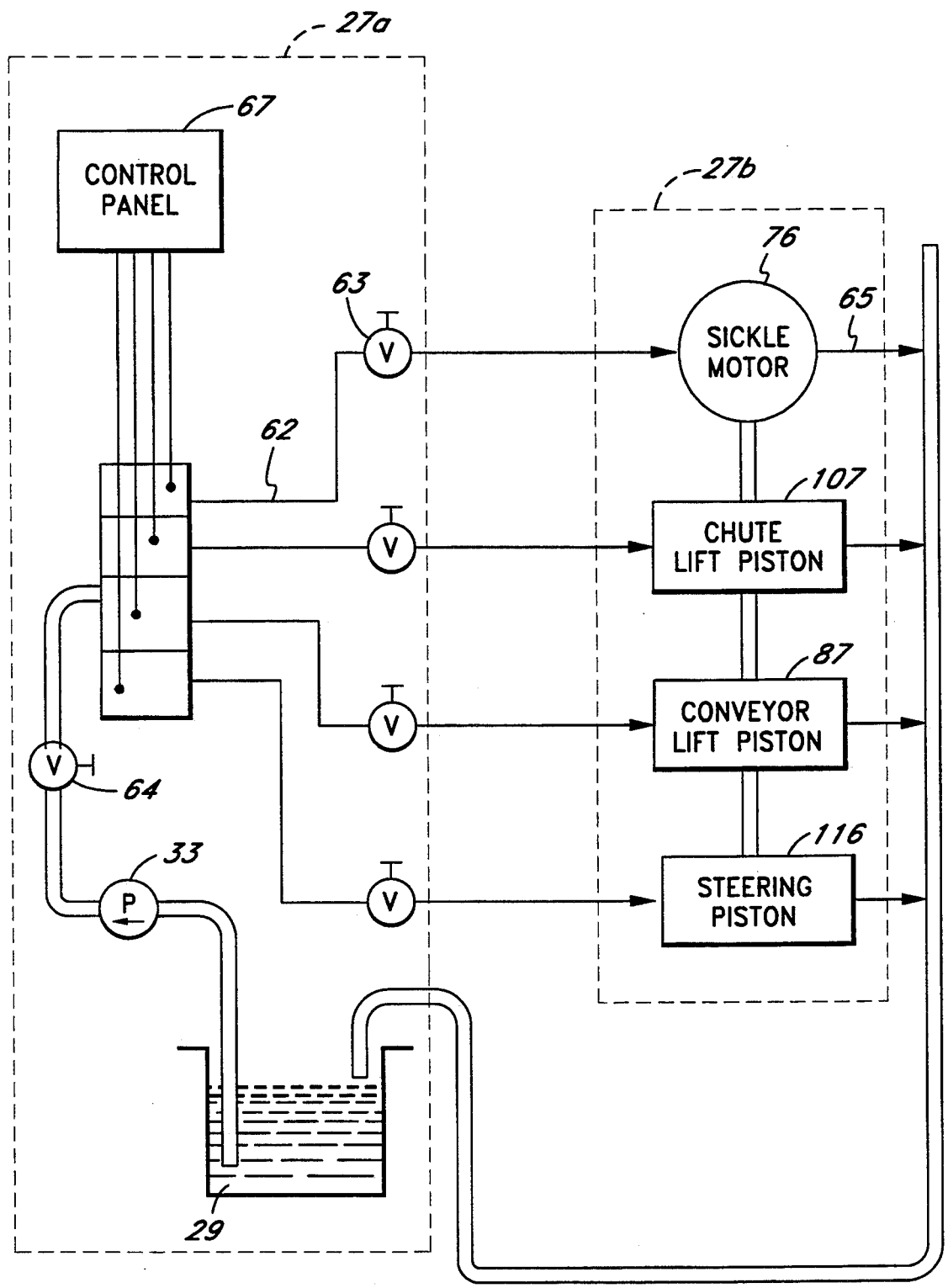
FIG. 12 is a schematic diagram of the hydraulic system of the vegetable topper.

Referring to the schematic diagram of FIG. 12, the hydraulic system 31 provides hydraulic fluid under pressure to an actuating motor and several pistons. The dashed box 27a on the left represents components mounted on the tractor, and the dashed box 27b on the right represents components on the topper 28. The hydraulic system 31 comprises a pump 33 which draws hydraulic fluid from a central reservoir 29. The hydraulic fluid is pressurized by the pump, and is then distributed to the various actuating motors and pistons via hoses 62. The components powered by the pump 33 comprise the sickle actuating motor 76, the conveyor pick-up lift piston 87, the rear chute lift piston 107 and the steering piston 116. An L38-7053 hydraulic pump with 0–15 gpm capacity at 280–3000 psi, sold by Sundstrum-Saur, has been found suitable for use as a pump.

The elements of the hydraulic system 31 and its hydraulic parts are remotely controlled from a central electrical control panel 67, mounted to the tractor, by means known in the art and not described in detail herein. The flow rate through each of the various hydraulic components, and thus the power and speed of operation of each component, may be adjusted by valves 63 associated with each component. The valves 63 allow the operational speed of the motor 76 and the position of the various pistons to be remotely controlled, depending on the speed of vegetable topper 28, and the wetness and density of seeders and onions 20, and the suction from fan unit 38. Shut off valve 64 located on the main hydraulic line from the pump 33 allows all of the hydraulic components to be shut off at once. Each actuating motor or piston receives the pressurized fluid through an inlet hose and discharges the fluid after use through an outlet hose, as shown by arrows 65. These outlet hoses return the used fluid back to the central reservoir 29. Suitable hoses are known in the art and not described in detail herein.

A John Deere tractor of about 100 horsepower, providing about 1000 rpm at the PTO, when traveling at about 3 mph and about 16–1800 rpm is believed suitable for pulling and powering vegetable topper 28. That would provide about 1700 rpm for the fan blades 55.

Per United States Department of Agriculture (USDA) marketing orders, the top grade of onions have stalks or tops that are no longer than three inches on 80% of the onions. The equipment of the present invention is believed to produce 90% of the onion with tops under three inches, at speeds of 3.5 mph and greater. The shearing type of cut afforded by the sickle blade 72 of the vegetable topper 28 more cleanly severs a larger percentage of upright stalks than rotary blades. Rotary blades tend to rip or just bruise some stalks, especially when dull. Additionally, the flat or horizontal orientation of the sickle blade 72 better meets the oncoming stalks for cutting the onion tops without damaging the onions 20. A sickle blade 72 generally perpendicular to the extended onion stalk 22 is believed preferable for efficient cutting.

The adjustable height of the sickle blade 72 provides flexibility to harvest varying types of onions 20. Onions can range from small red beanie onions, with a minimum diameter of two inches, to colossal yellow onions reaching six inches in diameter. The diameter of onions is normally measured across their width and the height dimension is typically less. Thus, when the sickle blade 72 is advantageously set at one inch greater than the average width of the onions being harvested, the average clearance over the upright bulb is slightly greater then one inch. For example, for a field of jumbo red beanie onions, of an average width of three inches, the sickle blade 72 is set to four inches above the pick-up conveyor ribs 94. The sickle blade 72 may be adjusted from between four and seven inches over the ribs 94, providing flexibility to harvest a majority of species of commercial-grade onions.

The fan unit 38 is commercially available, making it less expensive than a custom model and also relatively easy to service or replace. A 6-blade fan, 0–21 type, 1E sized, sold by Fan Engineering Company, Inc. of Huntington Beach, Calif., is believed suitable, with the fan speed being as high as 2200 rpm in wet, green onion fields, and as low as 1400 rpm in very dry onion fields. The resulting dust and particle stream exiting from the fan unit 38 is flung to the side over a wide area in fine particles which do not obstruct access to the previously topped, or untopped, onions with the heavy matter and plant tops as with prior devices, thus enabling subsequent harvesting and topping of onions even if covered by the mulch. The mulch degrades fast, and returns valuable nutrients to the soil for the next crop. The disposal of the tops 22 in the fields eliminates the environmental problems associated with disposing of large quantities of onion tops accumulated at packing facilities.

The remote operation of all the various hydraulically powered components of the vegetable topper 28 make it highly adaptable to changing conditions in the field. For example, the speed of the sickle blade motor 76 is variable allowing the blade speed to be increased for wetter areas, such as those at lower elevations.

The suction from fan unit 38 is advantageously sufficiently strong so that it can pick up onions which have neck rot or plate rot and are thus lighter than uninfected onions. The lighter, rotted onions are chopped up by the cutter blades 72 and fan blades 55, thus preventing spreading of the rot to other onions during shipment and storage, and making quality inspection easier. The suction will also pick up and mulch any onions 20 which are sufficiently undersized compared to other onions, which also makes sorting and grading of the onions easier.

The pick-up conveyors 80, under the vacuum hood 58, pick the topped onions 20 up from both beds being passed over by the topper 28. Advantageously, when the front end of conveyor 80 is adjacent the ground, it is at an angle of about 20° relative to the ground. The onions 20 are conveyed to the rear of the machine and deposited on the rear chute 100, which moves them over one of the adjacent beds for deposition. This reduces the subsequent gathering time. The ability to move the rear chute 100 allows the drop height of the onions 20 to be varied, and thus varying roughness of terrain may be adjusted for. The adjustment of the pick-up conveyors 80 and rear chute 100 allows onions 20 to be picked up, topped and redeposited with minimal bruising.

The maneuverability of the vegetable topper 28 has been improved with the addition of steerable rear wheels 114, especially combined with pickup pistons 87 and 107. The pulling tractor can make as sharp a turn as its wheel base is capable of without fear of running over obstacles at the inside corner and without having to make numerous time-consuming forward to rearward moves to make a sharp turn. Jack-knifing, or contact between the rear of the tractor and the towed machine, is minimized as well. The steering is remotely hydraulically actuated for simplified operation.

It should be appreciated from the above description that the present invention overcomes the lack of effective methods for efficiently topping varying sizes of vegetables in the field, such as onions, with a minimum of dust. While the above description represents the preferred embodiment, the present invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

We claim:

1. An apparatus for cutting the tops off of onions without damaging the bulb of the onion comprising:
   a wheeled support frame;
   one or more pickup conveyors supported by the frame to pick up onions from the ground and transport them rearwardly on the conveyor;
   a fan mounted on the frame and having a plurality of blades which rotate in a housing to create a suction;
   a hood supported over the conveyor in fluid communication with the fan in such a manner that sufficient suction is applied to the onions on the conveyors under the hood to lift the tops of the onions;
   a cutter beneath the hood for cutting the tops off the onions on the conveyor as the tops are lifted by the suction; and
   an air barrier beneath the portion of the conveyor beneath the hood located and configured to obstruct air from entering the hood from below the hood so as to increase the flow of air entering a portion of the hood.

2. The apparatus of claim 1, wherein said conveyors each include a front segment to pick up the onions and a rear segment generally parallel to the ground, and said hood extends over said rear segment.

3. The apparatus of claim 2, including a pair of spaced wheels supporting said frame, and wherein said conveyors are suspended beneath said frame, said fan is supported by and positioned generally above said frame, and a lower end of said hood extends beneath said frame to span said rear segment.

4. The apparatus of claim 3, wherein said fan and a motor for said fan are generally located on the frame on the forward side of said wheels, and said conveyor rear segment and said hood are generally located on the rear side of said wheels.

5. The apparatus of claim 1, wherein said hood includes a rear flap which extends downwardly close to said conveyor to restrict air from flowing into the hood in that area, sidewalls adjacent frame members on the side of said conveyor to restrict the air flow in that area, and a front wall spaced above the conveyor to define an entry to permit the onions to be moved beneath the hood, said front wall including a lower adjustable portion to vary the size of the entry to thereby vary the flow of air through the entry into the hood.

6. The apparatus of claim 5, wherein said air barrier comprises air barriers beneath the portion of the conveyor beneath said hood to restrict the air flow from the area beneath the onions.

7. The apparatus of claim 6, wherein each of said carriers includes a plurality of horizontally extending slats arranged in an endless chain around spaced sprockets such that there is an upper conveyor section conveying the onions towards the hood, and a lower return section, and said air barriers are located between said conveyor sections.

8. The apparatus of claim 1, wherein said fan blades are adapted to chop the tops of onions into small pieces.

9. An apparatus as defined in claim 1, wherein the suction hood has a length sufficient to extend across a plurality of beds of onions, and further comprising:
a rear chute located so as to receive onions from the rear width of all the pickup conveyors and deliver the onions to an area of reduced width.

10. An apparatus as defined in claim 1, wherein said cutter is oriented to provide a cutting angle such that the tops are cut substantially square relative to the onion bulb.

11. An apparatus as defined in claim 1, wherein said conveyor includes a rotating shaft to which are attached a plurality of flexible members which rotate in a direction to urge the onion bulbs off of the ground onto the pickup conveyor.

12. An apparatus as defined in claim 1, wherein said suction hood further includes an adjustable plate for adapting the suction to different onion conditions.

13. An apparatus as defined in claim 12, wherein said adjustable plate may be releasably secured in several directions relative to said suction hood.

14. An apparatus as defined in claim 13, wherein said adjustable plate depends from an intermediate member which depends from an elongated plate depending from said suction hood, said adjustable plate being capable of generally horizontal movement relative to said intermediate member, said intermediate member being capable of generally vertical movement relative to said elongated plate, and said elongated plate being capable of rotational movement about a hinge arranged transversely across the front of said suction hood, said elongated plate further including at least one bracket for swinging adjustment relative to said suction hood.

15. An apparatus for mechanically cutting the tops off of tuber vegetables while not damaging the tubers, comprising:
a wheeled support frame;
a fan connected to said frame for creating a suction sufficient to lift the tops of tubers into a position for cutting, the fan further providing means for chopping the cut tops into a plurality of small pieces;
means for communicating the suction to an area over a conveyor on which tubers ride, said means including an air barrier below at least a portion of said area of said conveyor to provide sufficient suction to lift the tops of the tubers into a position suitable for cutting; and
scissors-type cutting means for simultaneously cutting the tops off of a plurality of tubers, said cutting means being adjustably mounted so the height of the cutting means relative to the conveyors may be adjusted.

16. An apparatus as defined in claim 15, wherein said conveyor further comprises:
a first conveyor section for moving topped tubers from the ground in front of the cutting means to a second location, the first conveyor section having a front end movable relative to the ground; and
a second conveyor section for transporting the tubers underneath the cutting means and to a rear chute.

17. An apparatus for cutting the tops of onions on the ground while providing a high yield of topped but undamaged onions, comprising:
a wheeled support frame having wheels spaced to coincide with the spaces between beds of onions;
a fan mounted on the support frame and having a plurality of blades which rotate in a housing to create suction and constructed such that during operation the fan rotates at a speed sufficient to chop the tops of the onions into small pieces and discharge the chopped tops out of an exit from the fan housing;
a generally rectangular suction hood depending from the support frame to a location below the support frame, the hood being in fluid communication with the fan so that sufficient suction is applied to any onions under the hood to lift up the tops of the onions into an orientation suitable for cutting, the hood and fan being long enough to encompass at least two beds of onions;
a cutter bar located in the suction hood and extending along the length of the suction hood for a distance sufficient to provide a scissor-like cutting action to simultaneously cut the tops off a plurality of onions as the tops are lifted by the suction; and
an adjustable plate mounted so as to be releasably positioned along a length of the conveyor adjacent a front portion of the suction hood for adapting the suction to different onion conditions.

18. An apparatus for cutting the tops off of onions without damaging the bulb of the onion comprising:
a support frame;
a fan mounted on the frame and having a plurality of blades which rotate in a housing to create a suction;
a suction hood in fluid communication with the fan and extending over a quantity of onions in such a manner that sufficient suction is applied to the onions under the hood to lift the tops of the onions; and a cutter under the hood for cutting the tops off said onions as the tops are lifted by the suction;

said hood including rear and sidewalls for restricting air flow into the fan and including a front wall defining an entry for said onions into the area beneath said hood, and a mechanism for adjusting the characteristics of the air flow through said entry to best fit the characteristics of the onions to facilitate the lifting of the tops off the onion by said suction, the mechanism comprising an adjustable plate which is movable along a length of the conveyor to vary the air flow through said entry into the hood.

19. The apparatus of claim 18, wherein said mechanism includes an adjustable plate which extends generally transversely across said conveyor and is movable about a generally horizontal axis so as to vary its position along the length of the conveyor.

20. The apparatus of claim 19, wherein said adjustable plate is movable horizontally and vertically to vary the cross-sectional area of the air flow through said entry into the hood.

21. The apparatus of claim 19, wherein said front wall extends downwardly and forwardly at an angle with respect to vertical, and said mechanism includes a transversely extending elongated plate hinged to the lower end of said front wall, an adjustable plate, and an intermediate plate having its upper end adjustably connected to the lower end of said elongated plate to raise and lower said adjustable plate, and having its lower end slidably connected to said adjustable plate to enable the forward and rearward position of said adjustable plate to be adjusted.

22. A method for mechanically cutting the tops off of tubers while not damaging the tubers, comprising the steps of:

using a high speed fan with a plurality of fan blades to create a suction sufficient to lift the tops of tubers into a position for cutting;

communicating the suction to an area covering one or more conveyors on which tubers ride with sufficient suction to lift the tops of the tubers as needed for cutting;

adjustably positioning a plate horizontally relative to the conveyor where the conveyor enters the suction area to adjust the suction to accommodate different tuber conditions; and automatically cutting the lifted tops.

23. A method as defined in claim 22, comprising further steps of:

moving the onions from the ground to a location under the cutting means by using a pickup conveyor; and moving topped onions from the cutting location of the conveyor to a second location by a chute.

24. A method as defined in claim 22, wherein said fan creates sufficient suction to lift rotted onions into the cutter bar.

25. A method of claim 22, comprising:

chopping the cutoff tops of the tubers into a plurality of smaller pieces using the same fan that creates the suction to chop the tops, and ejecting those chopped tops away from the fan through a fan exhaust port.

26. A method as defined in claim 22, comprising further step of adjustably positioning said plate vertically and horizontally relative to said conveyor to adjust the suction.

27. A method for mechanically cutting the tops off of tubers while not damaging the tubers comprising the steps of:

creating a suction sufficient to lift the tops of tubers into a position for cutting by; using a high speed fan with a plurality of fan blades;

communicating the suction to an area covering one or more conveyors on which tubers ride with sufficient suction to lift the tops of the tubers, as needed for cutting;

placing an air barrier beneath the tubers so as to increase the flow of air entering a portion of the suction area to lift the tops of the tubers for cutting; and cutting the lifted tops.

28. A method as defined in claim 27, comprising the further step of adjustably positioning a plate horizontally relative to one of the conveyors where the conveyor enters the suction area in order to adjust the suction to accommodate different tuber conditions.

29. A method as defined in claim 28, comprising further step of adjustably positioning said plate vertically and horizontally relative to said conveyor to adjust the suction.

30. An apparatus for cutting the tops off of onions without damaging the bulb of the onion comprising:

a wheeled support frame;

one or more pickup conveyors supported by the frame to pick up onions from the ground and transport them rearwardly on the conveyor;

a fan mounted on the frame and having a plurality of blades which rotate in a housing to create a suction;

a hood supported over the conveyor and in fluid communication with the fan in such a manner that sufficient suction is applied to the onions on the conveyors under the hood to lift the tops of the onions;

a cutter beneath the hood for cutting the tops off the onions on the conveyor as the tops are lifted by the suction;

a pair of spaced wheels supporting said frame, and wherein said conveyors are suspended beneath said frame, said fan is supported by and positioned generally above said frame, and a lower end of said hood extends beneath said frame to span said rear segment, and wherein said conveyors each include a front segment to pick up the onions and a rear segment generally parallel to the ground, and said hood extends over said rear segment.

31. The apparatus of claim 30, wherein said fan and a motor for said fan are generally located on the frame on the forward side of said wheels, and said conveyor rear segment and said hood are generally located on the rear side of said wheels.

32. An apparatus for cutting the tops off of onions without damaging the bulb of the onion comprising:

a wheeled support frame;

one or more pickup conveyors supported by the frame to pick up onions from the ground and transport them rearwardly on the conveyor;

a fan mounted on the frame and having a plurality of blades which rotate in a housing to create a suction;

a hood supported over the conveyor in fluid communication with the fan in such a manner that sufficient suction is applied to the onions on the conveyors under the hood to lift the tops of the onions;

a cutter beneath the hood for cutting the tops off the onions on the conveyor as the tops are lifted by the suction; and wherein said hood includes a rear flap which extends downwardly close to said conveyor to restrict air from flowing into the hood in that area, sidewalls adjacent frame members on the side of said conveyor to restrict the air flow in that area, and a front wall spaced above the conveyor to define an entry to permit the onions to be moved beneath the hood, said front wall including a lower adjustable portion to vary the size of the entry to thereby vary the flow of air through the entry into the hood, and further including air barriers beneath the portion of the conveyor beneath said hood to restrict the air flow from the area beneath the onions.

33. An apparatus for cutting the tops off of onions without damaging the bulb of the onion comprising:
   a wheeled support frame;
   one or more pickup conveyors supported by the frame to pick up onions from the ground and transport them rearwardly on the conveyor;
   a fan mounted on the frame and having a plurality of blades which rotate in a housing to create a suction;
   a hood supported over the conveyor in fluid communication with the fan in such a manner that sufficient suction is applied to the onions on the conveyors under the hood to lift the tops of the onions, wherein the suction hood has a length sufficient to extend across a plurality of beds of onions;
   a cutter beneath the hood for cutting the tops off the onions on the conveyor as the tops are lifted by the suction; and
   a rear chute located so as to receive onions from the rear width of all the pickup conveyors and deliver the onions to an area of reduced width.

34. An apparatus for cutting the tops off of onions without damaging the bulb of the onion comprising:
   a wheeled support frame;
   one or more pickup conveyors supported by the frame to pick up onions from the ground and transport them rearwardly on the conveyor;
   a fan mounted on the frame and having a plurality of blades which rotate in a housing to create a suction;
   a hood supported over the conveyor in fluid communication with the fan in such a manner that sufficient suction is applied to the onions on the conveyors under the hood to lift the tops of the onions;
   a cutter beneath the hood for cutting the tops off the onions on the conveyor as the tops are lifted by the suction;
   wherein said suction hood further including an adjustable plate for adapting the suction to different onion conditions, wherein said adjustable plate may be releasably secured in several directions relative to said suction hood, and wherein said adjustable plate depends from an intermediate member which depends from an elongated plate depending from said suction hood, said adjustable plate being capable of generally horizontal movement relative to said intermediate member, said intermediate member being capable of generally vertical movement relative to said elongated plate, and said elongated plate being capable of rotational movement about a hinge arranged transversely across the front of said suction hood, said elongated plate further including at least one bracket for swinging adjustment relative to said suction hood.

35. An apparatus for cutting the tops off of onions without damaging the bulb of the onion comprising:
   a wheeled support frame;
   one or more pickup conveyors supported by the frame to pick up onions from the ground and transport them rearwardly on the conveyor, wherein there is an upper conveyor section conveying the onions towards the hood, and a lower return section with each of the upper and lower conveyors including a plurality of horizontally extending slats arranged in an endless chain around spaced sprockets;
   a fan mounted on the frame and having a plurality of blades which rotate in a housing to create a suction;
   a hood supported over the conveyor in fluid communication with the fan in such a manner that sufficient suction is applied to the onions on the conveyors under the hood to lift the tops of the onions, the hood including a rear flap which extends downwardly close to at least the upper conveyor to restrict air from flowing into the hood in that area, sidewalls adjacent frame members on the side of at least the upper conveyor to restrict flow in that area, and a front wall spaced above the conveyor to define an entry to permit the onions to be moved beneath the hood, the front wall including a lower adjustable portion to vary the size of the entry to thereby vary the flow of air through the entry into the hood;
   an air barrier located between the upper and lower conveyor sections and beneath the portion of the conveyor beneath the hood to restrict the air flow from the area beneath the onions; and
   a cutter beneath the hood for cutting the tops off the onions on the conveyor as the tops are lifted by the suction.

* * * * *